United States Patent
Porcile et al.

(10) Patent No.: US 9,676,605 B2
(45) Date of Patent: Jun. 13, 2017

(54) FUEL AND LUBRICATION TRUCK PLATFORM

(71) Applicant: FLUOR TECHNOLOGIES CORPORATION, Aliso Viejo, CA (US)

(72) Inventors: Bruno Porcile, Santiago (CL); Italo Avalos, Santiago (CL)

(73) Assignee: Fluor Technologies Corporation, Sugar Land, TX (US)

( * ) Notice: Subject to any disclaimer, the term of this patent is extended or adjusted under 35 U.S.C. 154(b) by 321 days.

(21) Appl. No.: 14/133,462

(22) Filed: Dec. 18, 2013

(65) Prior Publication Data

US 2014/0174599 A1 Jun. 26, 2014

Related U.S. Application Data (60) Provisional application No. 61/738,940, filed on Dec. 18, 2012.

(51) Int. Cl.
*B67D 7/04* (2010.01)
*B60P 3/24* (2006.01)
(Continued)

(52) U.S. Cl.
CPC ............ *B67D 7/68* (2013.01); *B60P 3/24* (2013.01); *B67D 7/04* (2013.01); *B67D 7/3209* (2013.01); *B67D 7/76* (2013.01)

(58) Field of Classification Search
USPC .............. 137/267, 351, 355.12, 899, 899.4; 141/94, 95, 104, 231
See application file for complete search history.

(56) References Cited

U.S. PATENT DOCUMENTS

| | | | | |
|---|---|---|---|---|
| 2,421,765 A | * | 6/1947 | Taylor | B60P 3/243 137/208 |
| 2,543,564 A | * | 2/1951 | Bakewell | B60P 3/24 137/255 |

(Continued)

FOREIGN PATENT DOCUMENTS

| | | |
|---|---|---|
| EP | 0459556 B1 | 6/1993 |
| EP | 0385105 B1 | 7/1993 |

(Continued)

OTHER PUBLICATIONS

Ground Force Mfg LLC, Marketing material (PDF spec sheet) for Fuel & Lube Trucks—Articulated; located at http://gfworldwide.com/product/articulated-fuel-lube-trucks/; Mar. 2012.

(Continued)

*Primary Examiner* — Kevin Murphy
*Assistant Examiner* — Jonathan Waddy
(74) *Attorney, Agent, or Firm* — Conley Rose, P.C.; Kristin Jordan Harkins (57) ABSTRACT

A fuel and lubricant refueling vehicle is described. The vehicle has a centralized control panel for monitoring and operating the fuel and lubricant delivery systems. The control panel is operable from ground level. The vehicle is capable of delivering fuels and/or lubricants at 300 gallons per minute. In addition, the vehicle is capable of storing a variety of different fuels and lubricants for servicing multiple types of equipment and work vehicles. The vehicle also has a power generator that supplies 50 cubic feet per minute of air flow to the motor pump assembly of the fuel and lubricant delivery systems.

6 Claims, 10 Drawing Sheets

(51) Int. Cl.
B67D 7/68 (2010.01)
*B67D 7/32* (2010.01)
*B67D 7/76* (2010.01)

(56) References Cited

U.S. PATENT DOCUMENTS

| | | | |
|---|---|---|---|
| 3,719,215 A | 3/1973 | Murray | |
| 3,814,148 A * | 6/1974 | Wostl | B60P 3/2255 137/234.6 |
| 3,908,721 A | 9/1975 | McGahey et al. | |
| 4,131,214 A * | 12/1978 | Rogers | B60P 3/225 222/1 |
| 4,911,330 A * | 3/1990 | Vlaanderen | B60P 3/224 222/132 |
| 5,349,994 A * | 9/1994 | Koeninger | B67D 7/08 137/351 |
| 5,873,498 A * | 2/1999 | Moore | B61C 17/02 141/114 |
| 5,893,398 A * | 4/1999 | Garrett, Jr. | B64F 1/28 137/312 |
| 6,178,991 B1 * | 1/2001 | Schiwek | B60P 3/22 137/351 |
| 6,447,556 B1 | 9/2002 | Cemenska et al. | |
| 6,941,969 B2 * | 9/2005 | Apostolides | F01M 11/0408 137/560 |
| 7,467,649 B2 | 12/2008 | Luntz et al. | |
| 2003/0010396 A1 * | 1/2003 | Jursich | G01F 23/2927 141/94 |
| 2007/0186980 A1 * | 8/2007 | Bauer | B60P 3/14 137/267 |
| 2011/0048572 A1 * | 3/2011 | Batson | B64F 1/28 141/1 |
| 2011/0278324 A1 * | 11/2011 | Kilian | B67D 7/04 222/135 |

FOREIGN PATENT DOCUMENTS

| | | | | |
|---|---|---|---|---|
| EP | 2253498 | A1 | 11/2010 | |
| EP | 2052139 | | 1/2012 | |
| JP | 2005016332 | A * | 1/2005 | |
| JP | WO 2010053045 | A1 * | 5/2010 | B60K 15/03 |
| KR | 1019980016108 | A | 5/1998 | |

OTHER PUBLICATIONS

Ground Force Mfg LLC, Marketing material (PDF spec sheet) for Fuel & Lube—Rigid Frame; located at http://gfworldwide.com/product/off-highway-fuel-lube-trucks/; Mar. 2012.

Ground Force Mfg LLC, Marketing material (PDF spec sheet) for Fuel & Lube—Skids; located at http://gfworldwide.com/product/fuel-lube-skids/; Mar. 2012.

Australia Patent Application No. 2013361429, Examination Report, dated Dec. 6, 2016, 4 pages.

PCT/US2013/076272, International Search Report, dated Apr. 8, 2014, 3 pages.

PCT/US2013/076272, Written Opinion of the International Search Authority, dated Apr. 8, 2014, 7 pages.

PCT/US2013/076272, International Preliminary Report on Patentability, dated Apr. 3 2015, 11 pages.

Australia Patent Application No. 2013361429, Notice of Acceptance, dated Jan. 27, 2017, 3 pages.

* cited by examiner

FUEL AND LUBRICATION TRUCK PLATFORM

This application claims the benefit of priority to U.S. provisional application Ser. No. 61/738,940 filed on Dec. 18, 2012, which is incorporated herein by reference in its entirety.

FIELD OF THE INVENTION

The field of the invention is vehicles, more specifically, truck platforms for refueling and re-lubricating other equipment.

BACKGROUND

The following description includes information that may be useful in understanding the present invention. It is not an admission that any of the information provided herein is prior art or relevant to the presently claimed invention, or that any publication specifically or implicitly referenced is prior art.

Refueling vehicles are frequently used in many industries and advantageously provide a mobile source of fuel and/or lubricants for servicing equipment. Examples of such industries include the aircraft industry, shipping industry, mining industry, and construction industry, among others. It should be noted that the present application is not intended to be limited to any particular industry unless otherwise specified in the claims.

While refueling vehicles are generally known (see for example, fuel and lube trucks sold by Ground Force™ at http://gfmfg.com/product/off-highway-fuel-lube-trucks/), there is a constant need for improved methods, systems, and technologies that decrease fueling time and increase ease-of-use. There is also a great need for refueling vehicles that can service different categories of equipment having different fuel and/or lube requirements.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved refueling vehicles.

SUMMARY OF THE INVENTION

The inventive subject matter provides apparatus, systems and methods in which a refueling vehicle includes a fuel delivery system and a lubricant delivery system. The fuel delivery system is configured to provide fuel to equipment, preferably at least about 300 gallons per minute or more. The lubricant delivery system includes a filling filter that has a 70 gallons per minute and 800 pounds per square inch filling capacity, with a 1.0 beta element for 7.5 microns, and with a silica vent with 2 microns capacity.

Both the fuel and the lubricant delivery system have a tank for storing the fuel and/or lubricant, and a sensor for measuring the amount full. The sensor provides a signal to a control system that monitors and controls the fill level of the tanks. The control system includes a centralized control panel that is located on the refueling vehicle such that it is operable by a user of average adult height from ground level. In preferred embodiments, the control panel is no more than 6 feet above ground.

The inventive subject matter also provides apparatus, systems and methods in which a fuel and/or lubricant tank on a piece of equipment (e.g., a work vehicle) has a sensor for sensing a presence of the fuel and/or lubricant. When the tank is partly or mostly empty, the sensor sends a signal to an outlet (e.g., air vent) of the tank that maintains the tank in an open position. During refueling, the opened outlet allows for the tank to maintain atmospheric pressure. Once the tank is substantially full, the sensor sends a signal to the outlet that closes the outlet to prevent spill.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
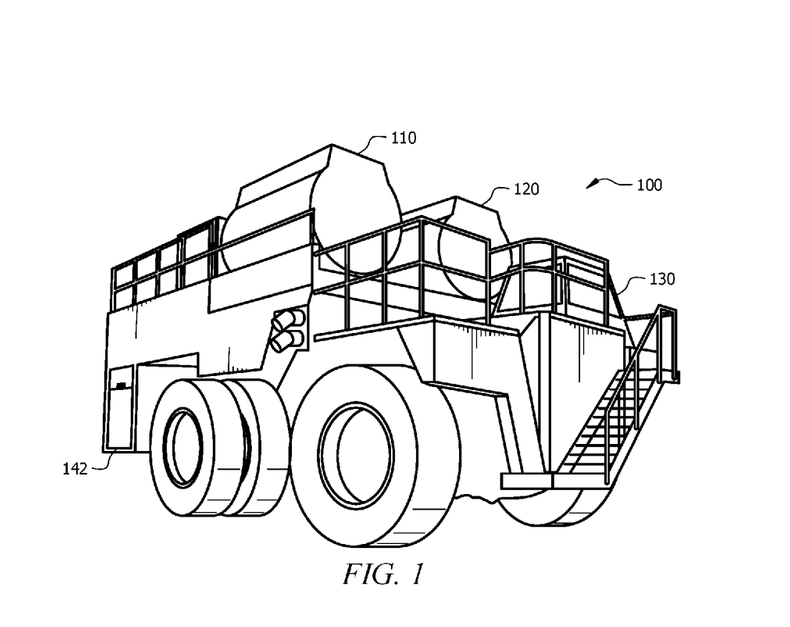
FIG. 1 is a perspective view of a refueling vehicle for servicing work vehicles.

FIG. 1 shows a refueling vehicle 100 (also known as a fuel truck or a truck platform). Vehicle 100 has a fuel and lubricant delivery system for servicing equipment that consumes fuel (e.g., gasoline, etc.) and lubricants (e.g., oil, grease, etc.). Vehicle 100 is specifically designed for servicing mining equipment such as work vehicles and mining machinery. However, the inventive principles illustrated by vehicle 100 could be adapted for, and applied to, other industries as well, such as the aircraft industry, the shipping industry, and the construction industry, to name a few.

Vehicle 100 has a tank 110 for storing fuel and a tank 120 for storing additional fuel, a lubricant, or any other fluid for servicing a piece of equipment such as a work vehicle. Vehicle 100 also has a cockpit 130 where a user controls at least some of the operational features of vehicle 100.

Figure 2:
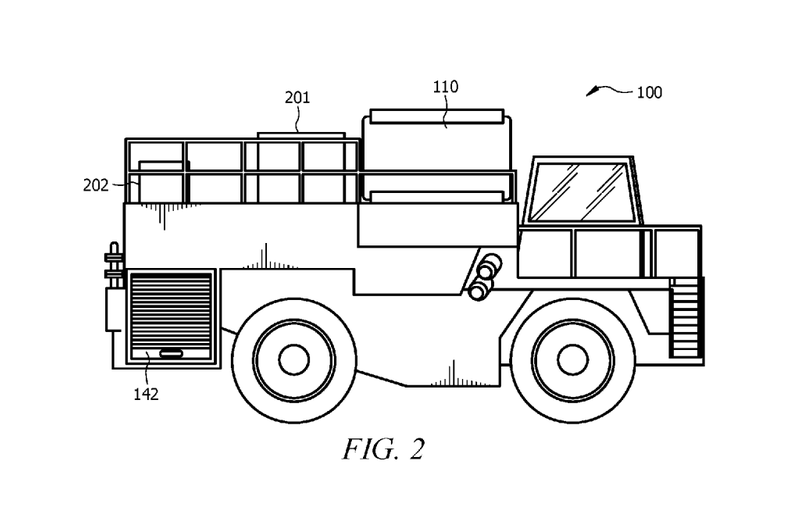
FIG. 2 is a left side view of the refueling vehicle of FIG. 1.
Figure 3:
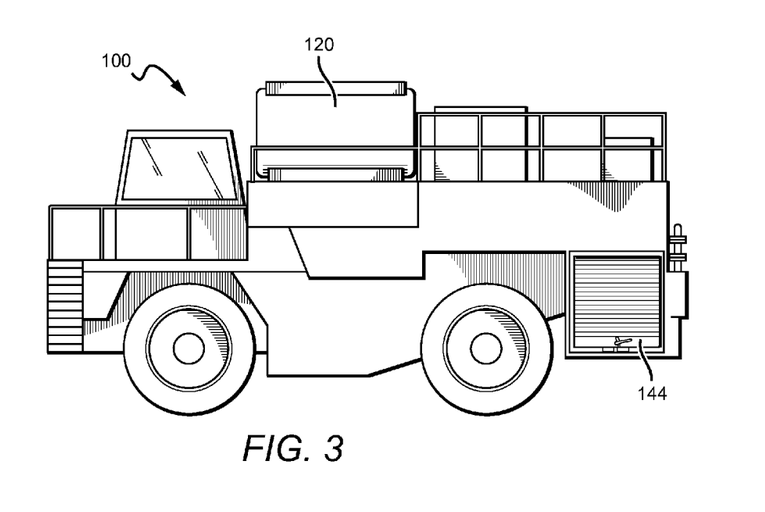
FIG. 3 is a right side view of the refueling vehicle of FIG. 1.

FIG. 2 is a left side view of vehicle 100, showing the location of the left side control panel 142. FIG. 2 shows the left side control panel 142 with its door in a closed position whereas FIG. 1 shows the left side control panel 142 with its door opened. The lubricant tank 201 and the energy source 202 of the vehicle 100 can also be seen in FIG. 2. FIG. 3 is a left right view of vehicle 100, showing the location of the right side control panel 144. The function and operation of the left and right side control panels will be discussed in further detail later on.

Figure 4:
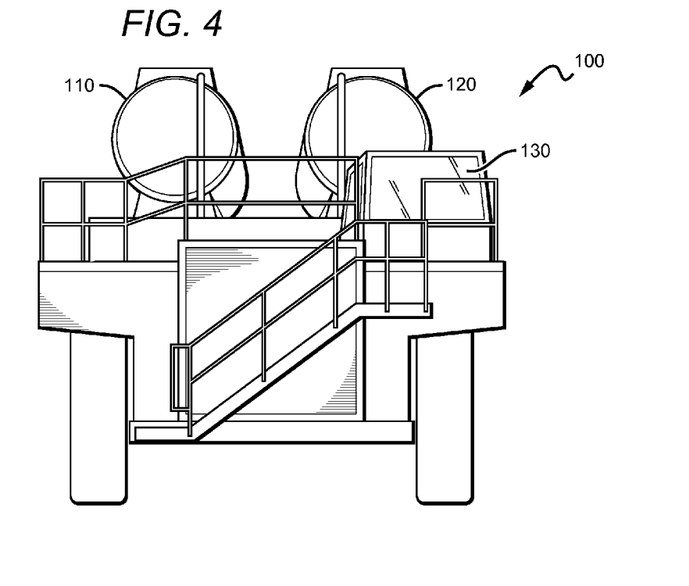
FIG. 4 is a front view of the refueling vehicle of FIG. 1.
Figure 5:
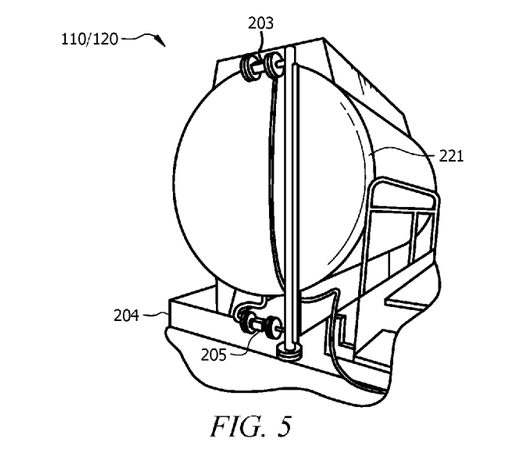
FIG. 5 is a close-up perspective view of a tank of the refueling vehicle of FIG. 1.

FIG. 4 shows a front view of vehicle 100, including tanks 110 and 120. FIG. 5 shows a close-up view of tank 110 or 120. Each of tanks 110 and 120 has a spill containment base 204 for capturing and containing any fuel that is leaked during refueling and operation. In some embodiments, tanks 110 and 120 are made of a double wall 221 and have a storage capacity of 7.500 m$^3$. Each of tanks 110 and 120 may also have a tanks surface treatment and tanks certification and calibration. Each of tanks 110 and 120 can be functionally independent, each having their own bottom valve 205 for operation. Each of tanks 110 and 120 preferably have a level sensor 203 for measuring, monitoring, and indicating fuel level, and for restricting the storage levels.

Figure 10A:
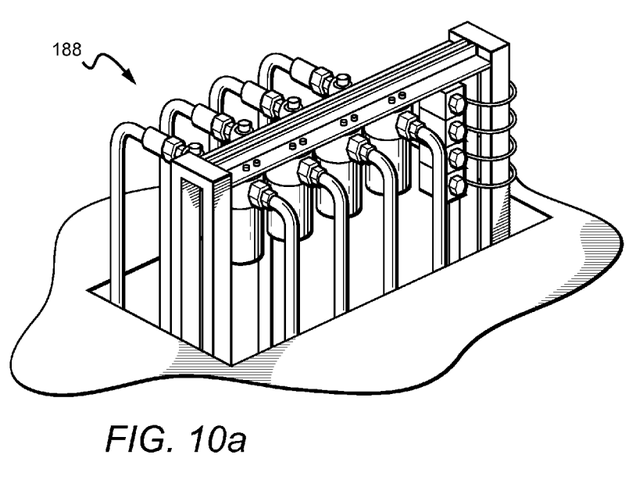
FIGS. 10a and 10b are top, side, perspective views of the micro filters for the oil delivery system of the refueling vehicle of FIG. 1.
Figure 10B:
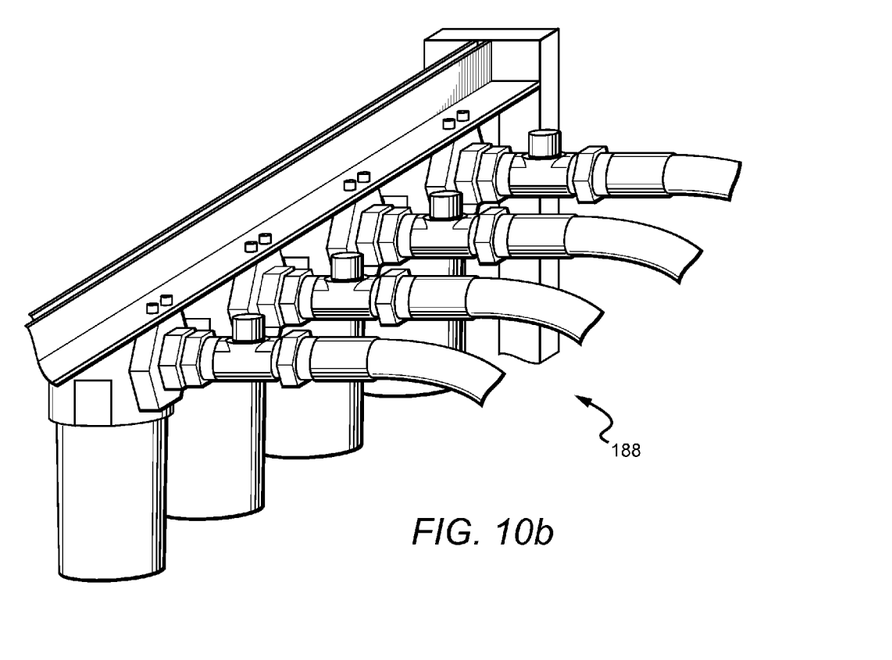

In other aspects of some embodiments, tank 110 and 120 are preferably coupled with a geared motor pump assembly 208 (shown in FIG. 8) that has an electric motor of at least 30 horsepower, and is capable of delivering fuel at least at 300 GPM. Tank 110 and 120 and the geared motor pump assembly 208 comprise a fuel delivery system. In some embodiments, tank 110 and 120 are coupled with the geared motor pump assembly 208 via one or more flexible hose 211 (shown in FIG. 8). The hose(s) 211 (or any of hoses 214 to 220 in FIG. 7) can couple directly with the bottom valves 205 of tanks 110 and 120 and with a valve 222 on the geared motor pump assembly 208. In some embodiments, the hose 211 (or any of flexible hoses 214-220 in FIG. 7) is at least 10 feet long. A dispensing gun 210 is shown having a valve 223. The dispensing gun 210 is coupled with the end of the flexible hose 211. FIG. 10a and FIG. 10b show the fuel delivery system can further include a filter 188 that has a 70 GPM and 800 psi filling capacity (see FIGS. 10a and 10b). Filter 188 can also have a 1.0 beta element for 7.5 microns. In addition, filter 188 can have a silica vent with 2 microns capacity for dust retention. In yet other aspects, filter 188 can include one Kidney unit (e.g., Kidney Loop Compac™) for permanent filtration, with a 1.000 beta element for 2 microns, which also allows installation of a moisture remover. In addition, each of tank 110 and 120 can further include a micro filter 209 (shown in FIG. 8) connected directly at the entrance to a retractable reel 212 (a static discharge reel). The model of this filter 209 is preferably the same as filter 188 for homologous replacement of all filter components.

Vehicle 100 also preferably has a lubricant delivery system for delivering lubricants to equipment and work vehicles. The lubricant delivery system can include a lubricant tank 201, located either externally on vehicle 100 or internally on vehicle 100 (not shown). The lubricant delivery system can also include a filling filter (e.g., filter 188) that has a 70 GPM and 800 PSI filling capacity, with a 1.0 beta element for 7.5 microns, and with a silica vent with 2 microns capacity. In some embodiments, the fuel and lubricant system may be one integrated system and the fuel and lubricant may be stored in the same tank and delivered to the equipment together.

In yet another aspect of some embodiments, vehicle 100 can have an energy source 202 (shown in FIG. 2 and FIG. 6) for providing operational power to the fuel delivery system, oil delivery system, and other systems (e.g., external lighting system, etc.). The energy source 202 preferably includes an air compressor that provides at least 50 cubic feet per minute (120 pounds per square inch, or 827.3 KPa) of air flow. In some embodiments, the energy source 202 is an electric power generator (e.g., Olympian caterpillar GEP 50-5, 45 KVA-36 KW-49 HP) that can operate at 1500 RPM, 50 Hz, 230/400 Volts, with a three-phase power factor 0.8. The power generator is preferably capable of supplying each geared motor pump assembly with hydraulic power at 10 HP, 1000 PSI, and 12 GPM.

Figure 6:
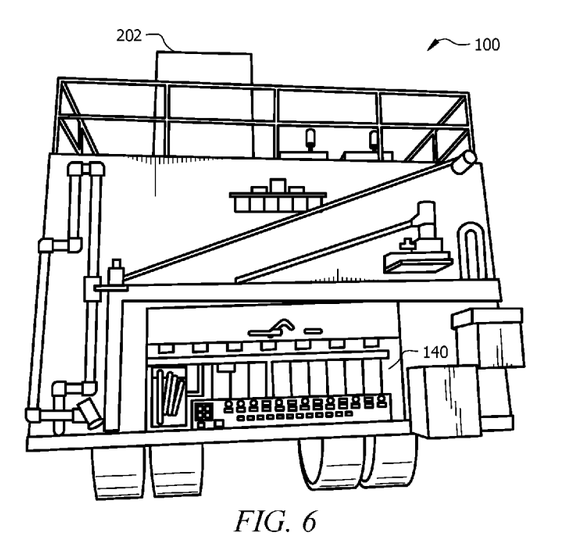
FIG. 6 is a back view of the refueling vehicle of FIG. 1.
Figure 7:
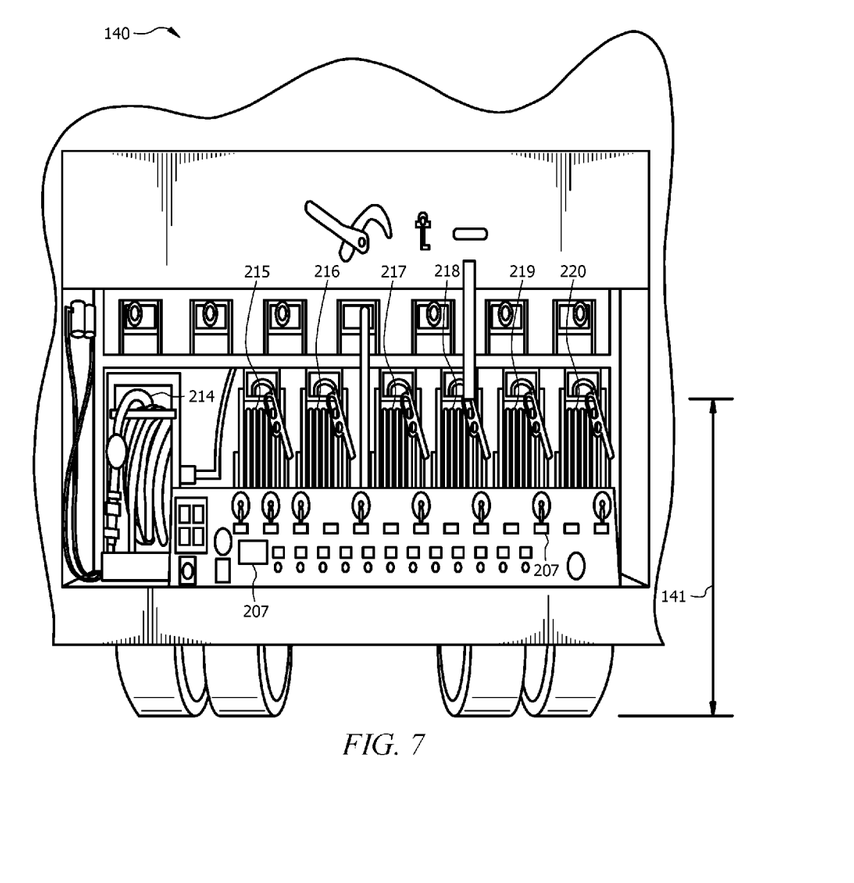
FIG. 7 is a close-up view of the back control panel of the refueling vehicle of FIG. 1.
Figure 8:
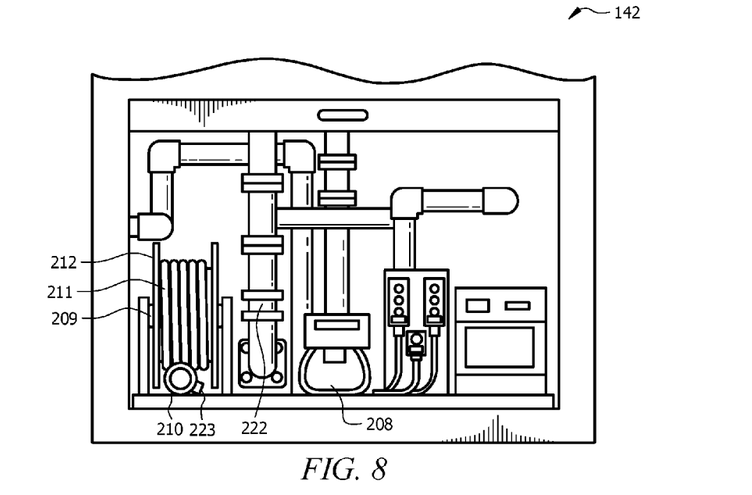
FIG. 8 is a close-up view of the left side control panel of the refueling vehicle of FIG. 1.
Figure 9:
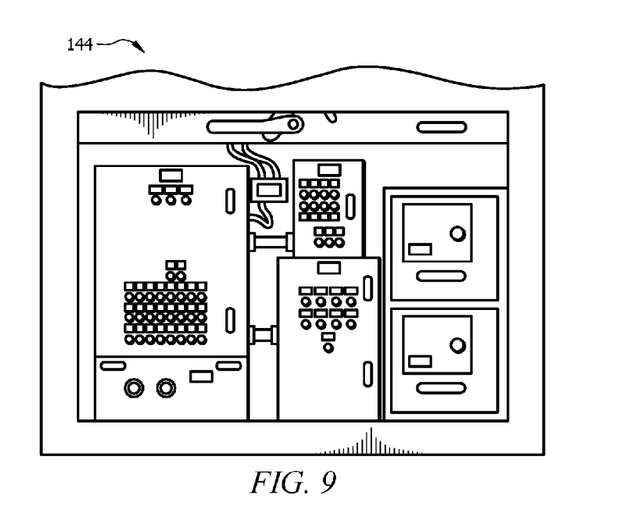
FIG. 9 is a close-up view of the right side control panel of the refueling vehicle of FIG. 1.

Vehicle 100 also has various control panels (e.g., back centralized control panel 140, left side control panel 142, right side control panel 144, etc.) for operating the fuel and lubrication delivery systems. FIG. 6 shows a back view of vehicle 100. At the back of vehicle 100 is a back centralized control panel 140. FIG. 7 shows a close-up view of panel 140. Panel 140 includes various flexible hoses 214, 215, 216, 217, 218, 219, and 220 that can be connected to a piece of equipment (e.g., a mining work vehicle, aircraft, machinery, etc.) in order to deliver a servicing fluid to the equipment. Panel 140 also includes various circuitry and electrical equipment 207 for displaying sensor data and for allowing a user to monitor and control the delivery of servicing fluids. FIGS. 8 and 9 show close-up views of left and right side control panels 142 and 144, respectively. Panels 142 and 144 have similar features as panel 140, including hoses and/or electrical controls for monitoring the delivery of fuels and lubrications.

Panels 140, 142, and 144 are located close to ground level and are accessible from ground level by an adult of average height. In some embodiments, the panels are less than 6 feet from the ground, more preferably less than 5 feet, most preferably, less than 4 feet (e.g., see distance 141). The design of vehicle 100 provides increases delivery efficiency over state of the art refueling vehicles due to the central location of all delivery hoses (which reduces the time to connect vehicle 100 with equipment) and due to the high gallon-per-minute delivery capacity.

Figure 11:
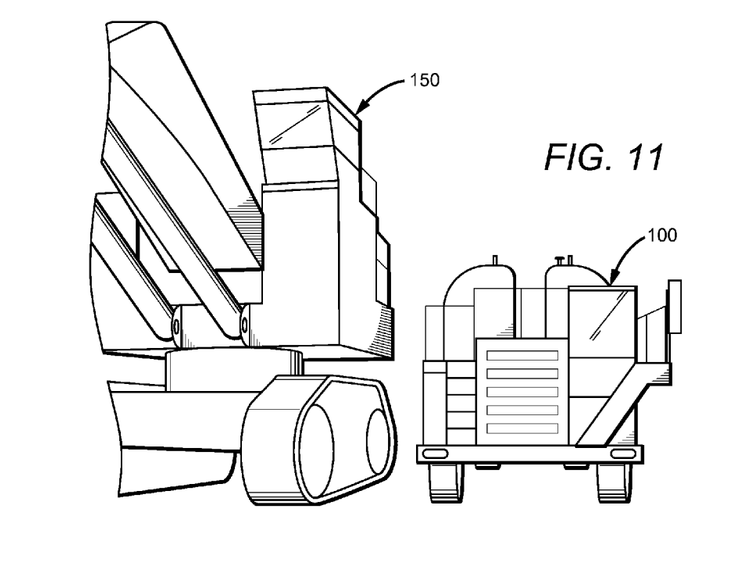
FIG. 11 is a perspective view of the refueling vehicle of FIG. 1 next to a work vehicle.

FIG. 11 shows vehicle 100 next to a work vehicle 150. The hoses of vehicle 100 can be connected with valves, hoses, and/or inlets on vehicle 150 to deliver servicing fluids to work vehicle 150.

Figure 12:
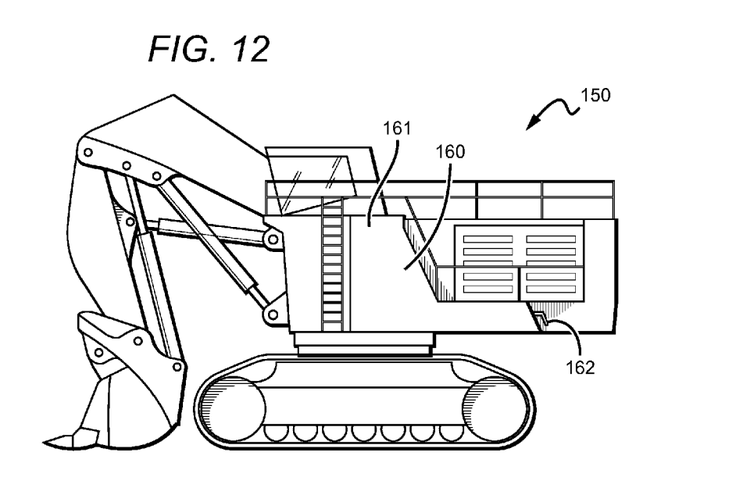
FIG. 12 is a side view of the work vehicle of FIG. 11.
Figure 15:
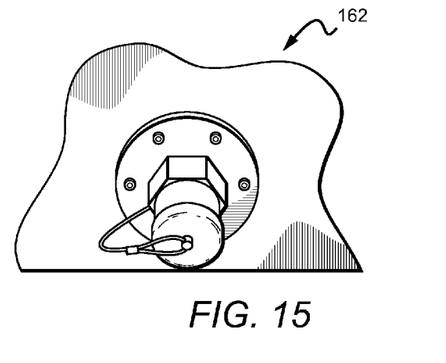
FIG. 15 is a close-up view of the fuel connector for refueling the fuel tank of the work vehicle in FIG. 11.

FIG. 12 shows a side view of work vehicle 150. Vehicle 150 has a tank 160 for storing fuel. Vehicle 150 also has a connector 162 for refueling tank 160. A close-up view of connector 162 is shown in FIG. 15.

Figure 14:
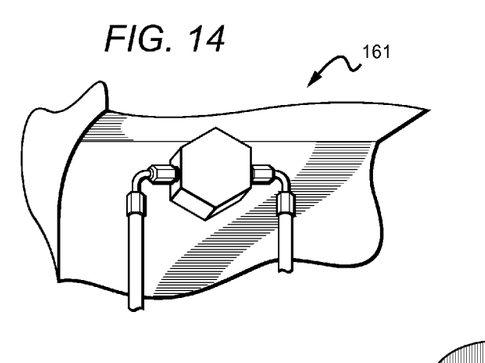
FIG. 14 is a close-up view of the exterior installation of the jet sensor of the fuel tank for the work vehicle of FIG. 11.

FIG. 12 also shows the exterior installation of jet sensor 161 that goes inside of tank 160 for sensing the fuel level. A close-up view of sensor 161 is shown in FIG. 14.

Figure 13A:
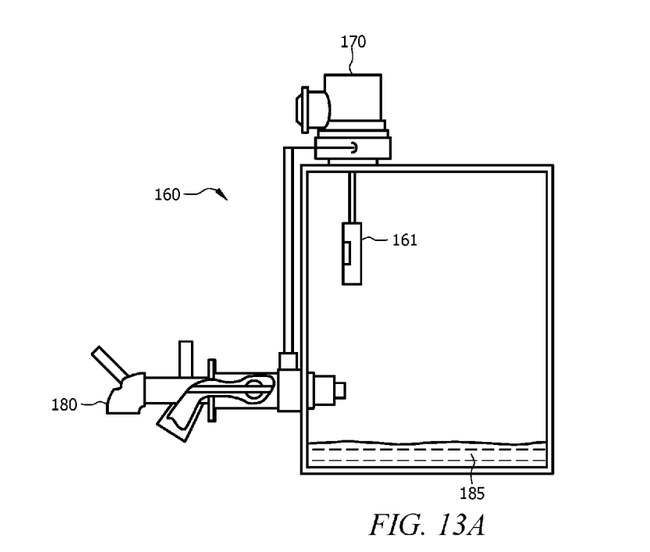
FIG. 13a is a cross-sectional view of the tank of the work vehicle of FIG. 11, illustrating the tank in an empty state.
Figure 13B:
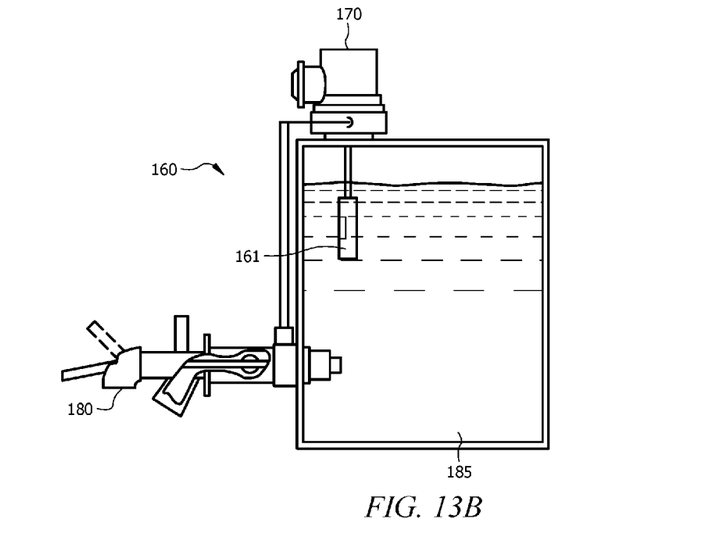
FIG. 13b is a cross-sectional view of the tank of the work vehicle of FIG. 11, illustrating the tank in a full state.

FIG. 13*a* shows a side view of tank 160 in an empty state. FIG. 13*b* shows a side view of tank 160 in a full state. Tank 160 has an inlet 180 and an outlet 170 (e.g., air vent). A hose or conduit can couple inlet 180 with a hose of refueling vehicle 100 so that vehicle 100 can deliver fuel 185 to tank 160. The conduit preferably includes no more than three bends to improve flow rate to tank 160.

Tank 160 has a jet sensor 161 that senses a presence of the fuel. Once tank 160 is substantially full, sensor 161 causes outlet 170 to switch from an open state to a closed state. In this manner, outlet 170 remains open during refueling to maintain the pressure inside tank 160 at atmospheric pressure. However, once tank 160 is full, outlet 170 closes to prevent spilling.

In addition to work vehicle 150, refueling vehicle 100 could service other vehicles and/or equipment. Panel 140 includes hoses, fixtures, and fasteners of different sizes and types for servicing a broad range of work vehicles. Vehicle 100 can be equipped with additional tanks for storing different fuels and lubricants that meet the specifications of different types of work vehicles.

Figure 16:
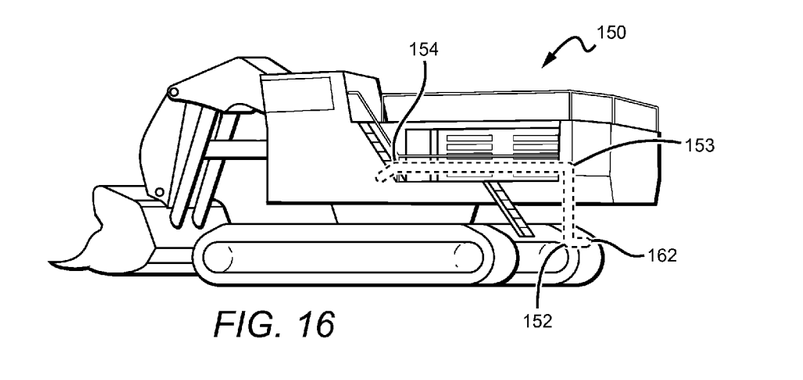
FIG. 16 is a side view of the work vehicle of FIG. 11, showing the refueling flow pathway.
Figure 17:
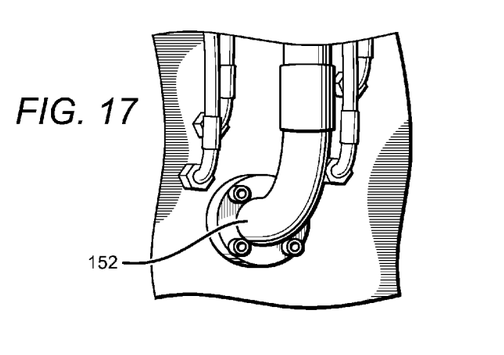
FIG. 17 is a close-up view of the first bend of the refueling flow pathway of FIG. 16.
Figure 18:
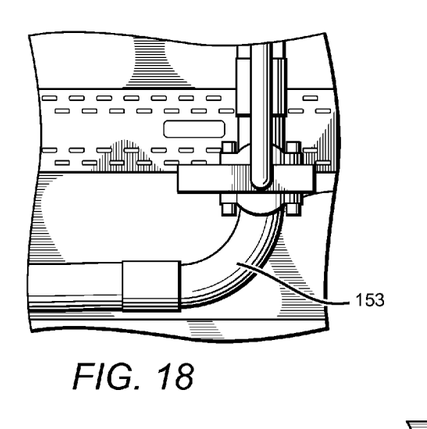
FIG. 18 is a close-up view of the second bend of the refueling flow pathway of FIG. 16.
Figure 19:
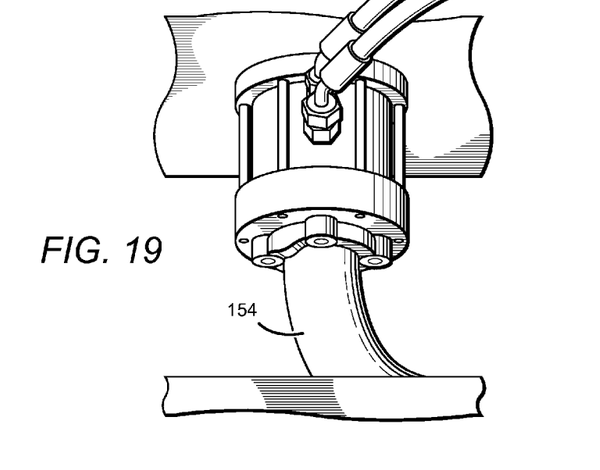
FIG. 19 is a close-up view of the third bend of the refueling flow pathway of FIG. 16.

FIG. 16 shows a side view of vehicle 150, with the refueling pathway from connector 162 to tank 160 in red. The pathway consists of three bends: a first bend 152, a second bend 153, and a third bend 154. A close-up view of bends 152, 153, and 154 are shown in FIGS. 17, 18, and 19, respectively. By limiting the refueling pathway to only three bends, refueling can occur at higher flow rates than more tortuous refueling pathways. In alternative embodiments, the refueling pathway may consist of only two bends, more preferably one bend, or most preferably zero bends. The refueling pathway will depend on various design parameters that are affected by the specifications of vehicle 100, and the equipment serviced by vehicle 100.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A refueling vehicle for servicing a plurality of equipment, comprising;
    a fuel delivery system configured to deliver a fuel at least at 300 gallons per minute (1.135 kiloliters per minute) at least one of the plurality of equipment, the fuel delivery system comprising:
        a first fuel tank and a second fuel tank, each fuel tank having (i) a double wall that defines a lumen for storing at least 2000 gallons (7.5 m$^3$) of the fuel and (ii) a bottom valve;
        a spill containment base that is sized, dimensioned, and positioned in relation to the first and second fuel tanks so as to provide a catch for spilled fuel;
        a sensor for restricting a storage level of the first and second fuel tanks;
        a flexible hose at least 10 feet long coupled with the bottom valves of the first and second fuel tanks;
        a geared motor pump assembly for creating a pressure difference that is effective in drawing the fuel out of the first and second fuel tanks and into the flexible hose when the bottom valves are in an open configuration at a flow rate of at least 300 gallons per minute; and
        a microfiltration filter for removing solids and moisture from the fuel;
    a lubricant delivery system for delivering lubricant to at least one of the plurality of equipment comprising:
        a lubricant tank; and
        a filling filter that has a 70 gallons per minute and 800 pounds per square inch filling capacity, with a 1.0 beta element for 7.5 microns, and with a silica vent with 2 microns capacity;
    an energy source for providing operational power to the fuel delivery system and the lubricant delivery system, the energy source comprising an air compressor that provides 50 cubic feet per minute (120 pounds per square inch, or 827.3 KPa) of air flow;

a centralized control comprising circuitry for electronically monitoring and controlling operation of the fuel delivery system and the lubricant delivery system, the centralized control being located on the refueling vehicle such that it is operable from ground level.

2. The refueling vehicle of claim 1, wherein the fuel delivery system further includes a dispensing gun comprising a valve coupled with an end of the flexible hose.

3. The refueling vehicle of claim 1, wherein the fuel delivery system further includes a static discharge reel.

4. The refueling vehicle of claim 1, wherein the centralized control is no more than 6 feet above ground level.

5. The refueling vehicle of claim 1, wherein at least one of the plurality of equipment is a mining work vehicle.

6. The refueling vehicle of claim 1, wherein the lubricant is oil.

* * * * *

UNITED STATES PATENT AND TRADEMARK OFFICE
CERTIFICATE OF CORRECTION

PATENT NO. : 9,676,605 B2  
APPLICATION NO. : 14/133462  
DATED : June 13, 2017  
INVENTOR(S) : Bruno Porcile and Italo Avalos Page 1 of 1

It is certified that error appears in the above-identified patent and that said Letters Patent is hereby corrected as shown below:

In the Claims

Column 6, Line 35, Claim 1: "at" should be "to at"

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*